3 Sheets--Sheet 1.

T. HYATT.
Improvement in Vault-Lights.

No. 133,032.  Patented Nov. 12, 1872.

Witnesses.
C. H. Poole
John R. Young

Inventor,
Thaddeus Hyatt, by
Prindle and Co, his Atty

3 Sheets--Sheet 2.

T. HYATT.
Improvement in Vault-Lights.

No. 133,032. Patented Nov. 12, 1872.

Witnesses.
C. H. Poole
John R. Young

Inventor,
Thaddeus Hyatt, by
Prindle & Co., his Attys

3 Sheets--Sheet 3.

T. HYATT.
Improvement in Vault-Lights.

No. 133,032.  Patented Nov. 12, 1872.

Witnesses.
C. H. Poole.
John R. Young

Inventor,
Thaddeus Hyatt, by
Prindle and Co, his Attys

UNITED STATES PATENT OFFICE.

THADDEUS HYATT, OF ATCHISON, KANSAS.

IMPROVEMENT IN VAULT-LIGHTS.

Specification forming part of Letters Patent No. 133,032, dated November 12, 1872.

*To all whom it may concern:*

Be it known that I, THADDEUS HYATT, of Atchison, in the county of Atchison and State of Kansas, have invented certain new and useful Improvements in Vault-Covers, Sidewalks, Floor-Lights, &c., constructed wholly or in part of glass; and I do hereby declare that the following is a full, clear, and exact description of the same, reference being had to the accompanying drawing making a part of this specification, in which—

Figure 1:
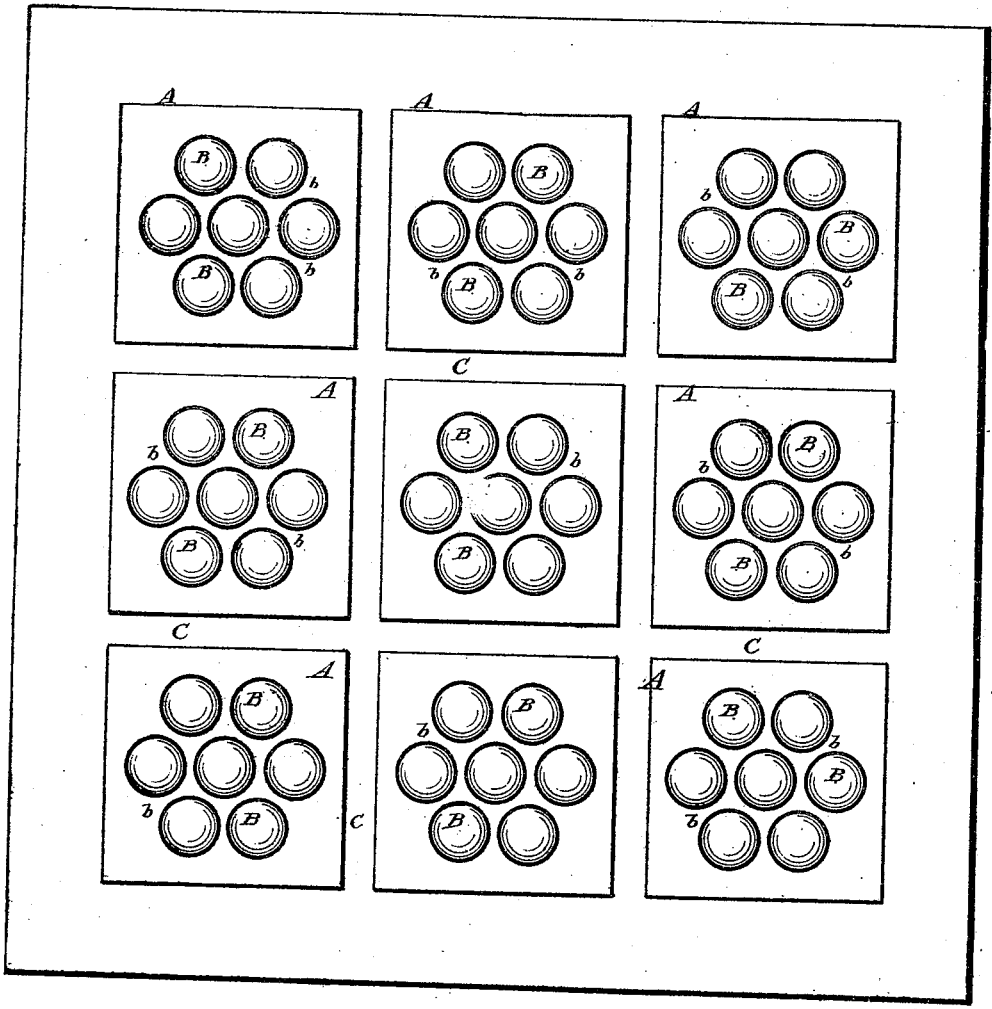
Figure 2:
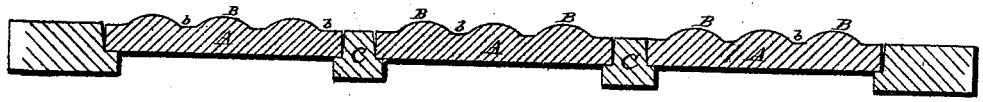
Figure 3:
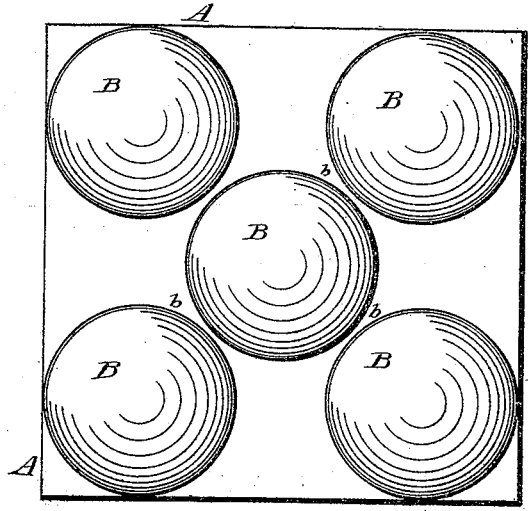
Figure 4:
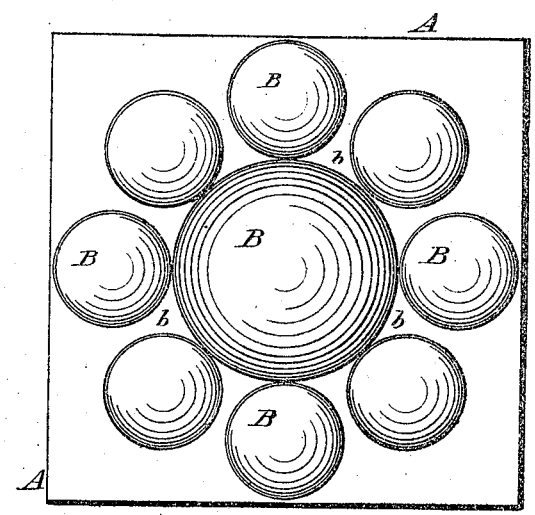
Figure 5:
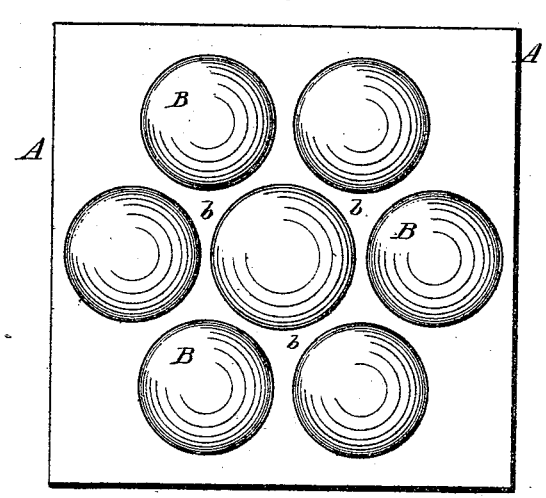
Figure 6:
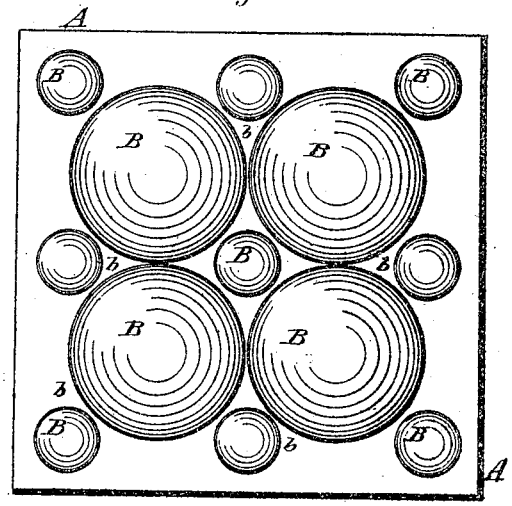
Figure 7:
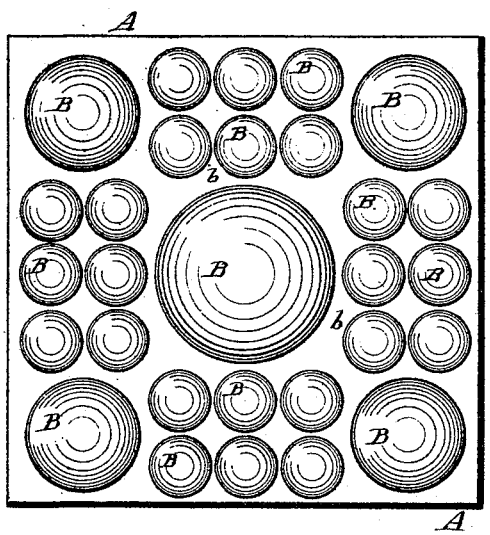
Figure 8:
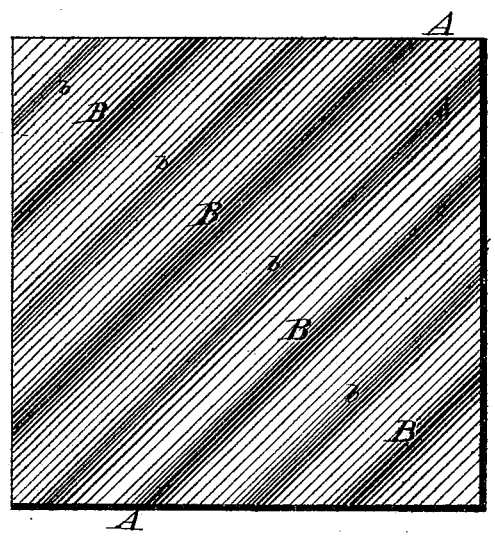
Figure 9:
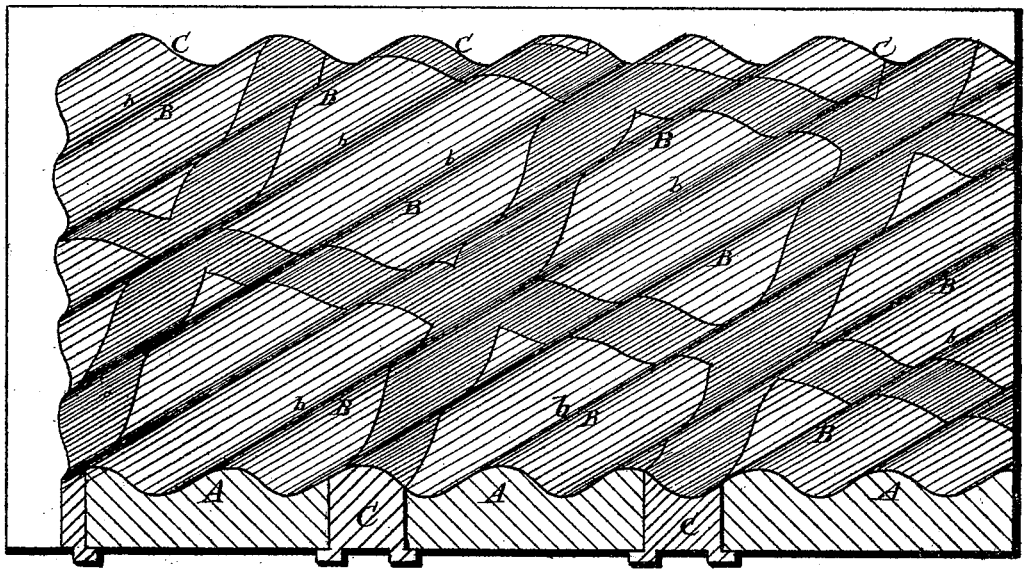

Figure 1 is a plan view of a pavement or area cover constructed by my improved method; Fig. 2 is a cross-section of the same; Figs. 3 to 8 represent panels of glass as used in metal frames, and having different configurations of their outer or bearing-surfaces; and Fig. 9 is a perspective view of a section of a pavement or area-cover constructed from or with the style of panel shown in Fig. 8.

Letters of like name and kind refer to like parts in each of the figures.

When used in pavements, vault-covers, area-covers, or other places, it is found that the exposed surface of glass becomes opaque through the abrasive action of dust and dirt as the same is ground beneath the feet of persons passing over said glass, and that, consequently a large percentage of its light-transmitting powers are lost, and in so far the object had in view in the employment of glass in such positions, is defeated. To remove these objections, and to render the glass self-cleansing by the action of the wind or rain, is the design of my invention, which consists in a glass section or pane, provided upon its upper or outer surface with a plurality of elevated bearing-points, substantially as and for the purpose hereinafter specified.

In the annexed drawing, A represents a section or pane of glass having any desired exterior form or dimensions, upon the outer side of which is provided two or more protuberances, B, that are wholly above the surface of said section, and are, preferably, so constructed and relatively arranged as to leave between a channel, *b*, through which water may freely pass, by the force of gravity, from all parts of the surface of said glass. The number, shape, size, and relative arrangement of the elevations B are governed by the special requirements of the place where the glass is to be employed or the taste of the user, it being immaterial whether, as seen in Figs. 1 to 7, said bearings are semi-spherical, or, as shown in Fig. 8, they are so shaped as to cause the surface to present a corrugated appearance, with the ridges and their separating-channels formed upon straight parallel lines. The sections thus constructed are fitted into corresponding openings formed in a metal frame, C, and their edges secured in the usual manner, the outer surface of said glass being just flush with the corresponding surface of said frame, so that water falling upon the same may readily pass outward and off.

When the ridged glass is employed it will be necessary that the supporting-frame should be so constructed as to cause the metal to form continuations of the channels *b*, and to arrange the sections so as to cause said channels to run in parallel lines entirely across the grating.

The result of the hereinbefore-described construction of the glass sections is, that only the highest portions of its surface will be abraded and its translucency impaired, while dust or dirt falling upon the grating will be readily washed or blown from the channels, and one heretofore serious difficulty removed. Another advantage is found in the increased light-transmitting power of the glass, as from the large number of angular faces presented by the sides of the elevated portions of the glass panels the horizontal and oblique rays of light are caught and refracted into the space beneath instead of being reflected from the surface of the glass and lost. The arrangement of the elevations and depressions or channels, by means of which the angular faces are prevented from becoming obscured, largely increases the efficiency of the panels.

Having thus fully set forth the nature and merits of my invention, what I claim as new is—

In a vault-cover, sidewalk, floor-light, &c., composed wholly or in part of glass, a glass panel, provided upon its upper or outer surface with a plurality of bearing-points of considerable elevation, separated by channels whose lowest points are not below the general level of the surrounding surface, substantially as specified.

THADDEUS HYATT.

Witnesses:
J. F. HUTTNER,
A. W. LAKE.